(No Model.)
H. C. TAFEL.
LOCKING DEVICE FOR BICYCLES.
No. 542,507. Patented July 9, 1895.
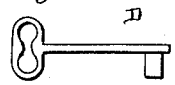
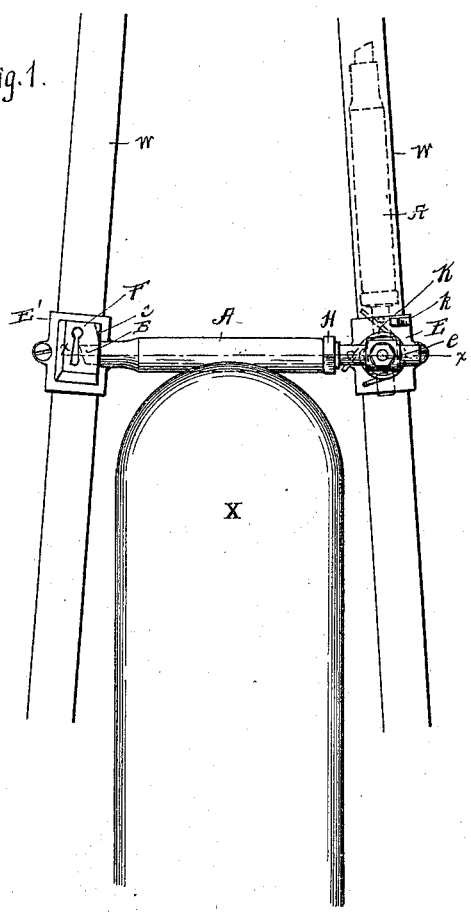
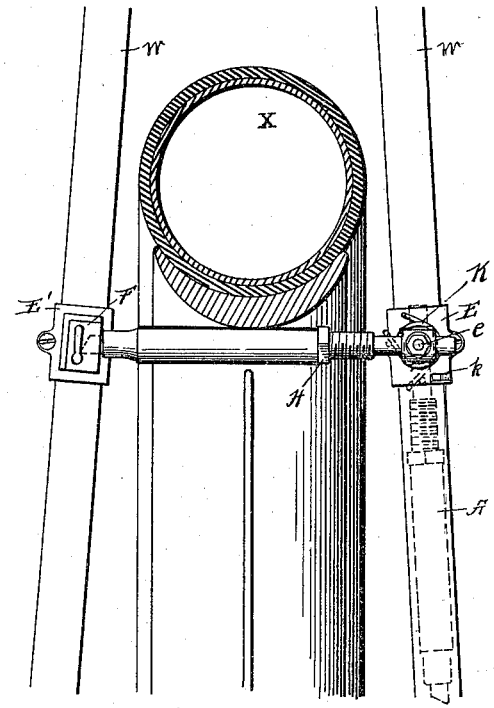
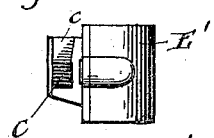
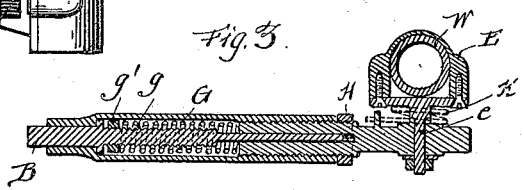
Witnesses:
Geo. M. Anderson
George H. Parmelee
Inventor:
H. C. Tafel
by E. W. Anderson
his Attorney.

UNITED STATES PATENT OFFICE.

HERMAN C. TAFEL, OF LOUISVILLE, KENTUCKY.

LOCKING DEVICE FOR BICYCLES.

SPECIFICATION forming part of Letters Patent No. 542,507, dated July 9, 1895.

Application filed October 19, 1894. Serial No. 526,397. (No model.)

*To all whom it may concern:*

Be it known that I, HERMAN C. TAFEL, a citizen of the United States, and a resident of Louisville, in the county of Jefferson and State of Kentucky, have invented certain new and useful Improvements in Locking Devices for Bicycles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a rear elevation of the invention applied to tire of wheel, showing portions of bicycle and showing the released position of bolt in dotted lines. Fig. 2 is a similar view, partially in section, showing invention applied to inner rim of wheel, the released position of bolt being shown in dotted lines. Fig. 3 is a section on line $x\,x$, Fig. 1. Fig. 4 is an elevation of clip $E^4$. Fig. 5 is a detail of key.

This invention has relation to a locking device for bicycles and similar vehicles, the object being to provide means of simple and effective character for preventing a bicycle being used by any one except the owner or person having the key to the lock; and the invention consists in the novel construction and combination of parts, all as hereinafter described.

The object of this invention is to provide a simple and efficient lock for preventing bicycles and the like from being used during stops by others than the owner.

The invention is designed to be applied to bicycles as a part thereof at the time of manufacture, or it may be made and sold separately and applied to any wheel.

The invention more particularly consists in a locking-bar A, one end of which is pivotally attached to the frame upon one side of one of the wheels, the opposite end portion carrying a spring-bolt B, arranged to engage a keeper or socket C, carried by the frame upon the opposite side of the wheel, said bar when so engaged pressing upon the tire of the wheel and exerting a sufficient braking action thereon to prevent its use, a suitable key D being also provided to engage a keyhole of said keeper or socket to operate on said bolt to effect its release by the owner.

I have herein shown and described a simple, convenient, and effective embodiment of the invention as I prefer to make and use it; but details in the construction thereof may be modified or changed without departing from the spirit and scope of my invention.

E E' designate a pair of clips, one of which is applied to each leg W of the rear fork, adjacent to the periphery of the rear wheel X. The clip E is provided with a projecting stud e, upon which is pivotally secured one end portion of the locking-bar A. The clip E' has thereon a chambered lug F, which forms a socket for the spring-bolt B, carried by the opposite end of said bar A. The end of said bolt and the approach c to said socket are beveled, so that the bolt will readily ride into the socket. To receive the bolt B the bar A is formed with an interior socket or cavity, in which said bolt seats against the tension of a spring G.

The bar A is made adjustable in length, being formed in two sections, one of which is threaded upon the other, whereby said bar may be lengthened to compensate for the greater width of forks found in some styles of machines. A jam or locking nut H secures the proper adjustment. It also becomes necessary to provide a corresponding adjustment of the bolt B, which I effect by providing the shank thereof with a threaded portion g, upon which works a nut g'. One end of the spring is seated upon the end of the inner section of the bar and the other end against said nut.

When the device is applied permanently to a bicycle at the time of manufacture, no adjustment will be required, and a bar made in one piece can be employed. To give said bar the proper tension to hold it out of contact with the tire when its bolt D is released from the socket C by the manipulation of key D, a spring K is coiled around the stud e, one end thereof being made fast to the bar and the other to the lug E or to the frame of the machine. The winding of the spring is such that as the bar is brought into locking contact with the wheel it is compressed, whereby, when the bar is released, the accompanying expansion of the spring throws the bar away from the wheel and holds it in contact with a stop k.

Although I have shown the device applied to the rear wheel, it can be equally well applied to the front wheel, and is also applicable to tricycles.

In some cases—as, for instance, where the wheels are covered by a mud-guard—the lock can be applied in such a manner that the bar A will exert its braking action upon the inner face of the rim, as shown in Fig. 2. In this event said bar is preferably covered with rubber or other suitable yielding or elastic material. I prefer, however, to employ the outside arrangement wherever practicable. The bar, when released, lies in close relation to the leg of the fork and is entirely out of the way.

The weight of the device is not enough to materially add to the weight of the machine.

In addition to serving as a lock for the wheel the device also acts to steady the wheel when the machine is placed against a support and holds it much more readily in a fixed or upright position.

Having thus described my invention, what I claim as new, and desire to secure by Letters Patent, is—

1. A locking device for bicycles and similar vehicles comprising a bar pivotally attached to the frame of the machine upon one side of one of the wheels thereof, and formed in two sections, one of which is adjustably secured upon the other, and a keeper attached to the frame upon the opposite side of the wheel and adapted to receive said bar, means whereby the bar is locked in said keeper, said keeper having a key-hole to receive a key to act upon said bar and release it from said keeper, substantially as specified.

2. A locking device for bicycles and similar vehicles comprising a bar pivotally attached to one leg of one of the forks of the machine, a spring actuated bolt seated in the opposite end portion of said bar, a socket for said bolt upon the opposite leg of the fork, and a suitable key for releasing said bolt, said bolt and its lock being arranged so that when the former is in use, it is forced into compressing relation to the tire substantially as specified.

3. A locking device for bicycles and similar vehicles, comprising a bar formed in two sections adjustable one upon the other, means for pivotally securing said bar at one end to one end of the legs of one of the forks of the machine, a bolt seated in the opposite end portion of said bar, a spring arranged to act upon said bolt, means for adjusting said bolt to correspond to the adjustment of the bar, a socket designed to be attached to the opposite leg of said fork and to receive said bolt, a key for releasing said bolt and a spring arranged to act upon said bar, substantially as specified.

4. The combination with a bicycle fork, of a bar pivotally attached to one leg thereof, a locking bolt carried by said bar, and a keeper attached to the opposite leg of the fork, and adapted to receive said bolt, said keeper having a key hole to receive a key to act upon said bolt and release it from said keeper, substantially as specified.

In testimony whereof I affix my signature in presence of two witnesses.

HERMAN C. TAFEL.

Witnesses:
ALB. C. TAFEL,
JOHN E. WATSON.